April 9, 1957 H. J. SOGN 2,788,018
BALL COCK VALVE ASSEMBLY FOR FLUSH MECHANISMS
Filed July 5, 1955

INVENTOR.
HAROLD J. SOGN
BY Bruce & Brosler
HIS ATTORNEYS

United States Patent Office 2,788,018
Patented Apr. 9, 1957

2,788,018

BALL COCK VALVE ASSEMBLY FOR FLUSH MECHANISMS

Harold J. Sogn, Oakland, Calif., assignor of one-half to Otto J. Suendermann

Application July 5, 1955, Serial No. 519,993

4 Claims. (Cl. 137—400)

My invention relates to flush mechanisms for flush tanks or the like, and more particularly to a ball cock valve assembly therefor.

A common problem encountered in the operation of flush mechanisms lies in the unsatisfactory performance of the shut-off valve in such a mechanism. In the normal operation of a conventional flush mechanism, the closing of the shut-off valve is wholly under control of a ball float riding on the surface of the water in the tank. Accordingly, the closing movement of such valve is slow and gradual, and tapers off as the water approaches the desired level, thus often resulting in a hissing or singing noise before shut-off actually occurs, and in many instances, due to the tapering off of the valve movement, efficient seating of the valve is not realized.

Among the objects of my invention are:

1. To provide a novel and improved flush mechanism for flush tanks;

2. To provide a novel and improved ball cock valve assembly for flush mechanisms;

3. To provide a novel and improved ball cock valve assembly for flush mechanisms which shall assure positive seating of the valve;

4. To provide a novel and improved ball cock valve assembly for flush mechanisms, which will operate noiselessly.

Additional objects of my invention will be brought out in the following description of a preferred embodiment of the same taken in conjunction with the accompanying drawings, wherein Figure 1 is a view in section through a ball cock valve assembly of the present invention, and depicting the same in open condition, and at an intermediate point in the filling cycle of a flushing operation;

Figure 1:
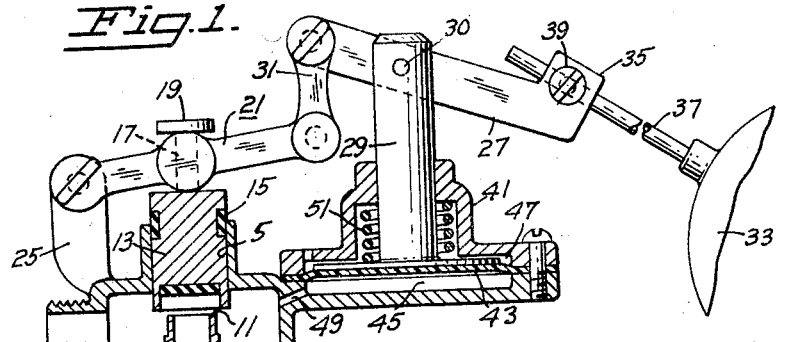
Figure 2:
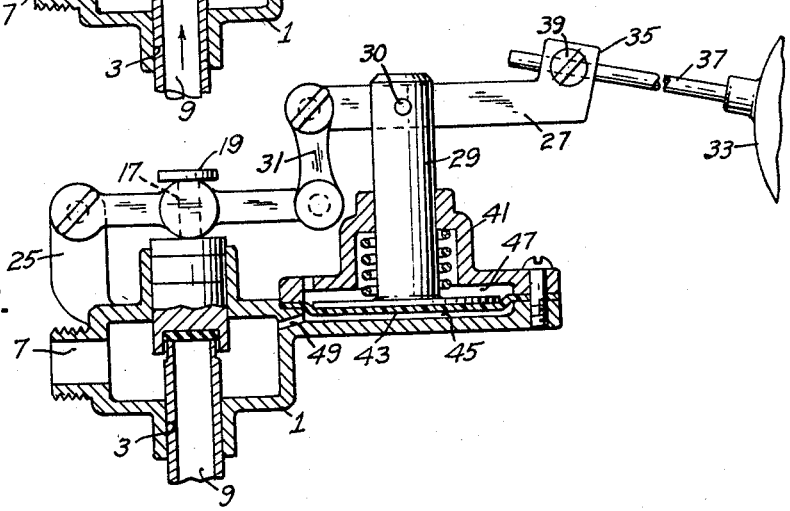
Figure 2 is a view in section, similar to that in Figure 1, but depicting the valve assembly at rest following a filling of a flush tank.
Figure 3:
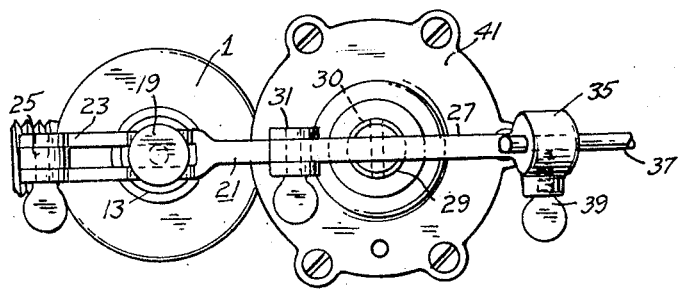
Figure 3 is a view in plan of the valve assembly of Figures 1 and 2.

Referring to the drawings for details of my invention in its preferred form, I have disclosed therein only that much of a flush mechanism involving the ball cock valve assembly, to which the present invention is directed. Such assembly involves a main flow chamber 1 having an intake pipe opening 3, a valve opening 5 in alignment therewith, and a discharge opening 7.

Extending into the main flow chamber through the intake pipe opening, is an intake pipe 9, which terminates within the chamber in a valve seat 11 facing the valve opening, within which is slidably mounted a valve 13 provided with an O-ring seal 15 and capable of moving into and out of engagement with the valve seat. This valve is provided with a stem 17 terminating in a disc type head 19.

Basic movements of the valve, to and from the valve seat, are responsive to variations of water level in the flush tank when assembled therein, in that the valve moves away from its seating position as the water level in such flush tank drops during a flushing operation, and returns toward seating position as the water level in the flush tank rises during the filling cycle following the flushing operation.

Such basic movements are realized through a float controlled lever assembly including a first lever 21 having one end 23 bifurcated to permit the same to straddle the valve stem 17, the bifurcated end then being hingedly secured to a fixed point such as the upper end of an extension or support 25 arising from the main flow chamber.

A second lever 27 is pivotally secured to an upper end of a fulcrum post 29, by a pin 30, with one end of such lever terminating substantially in vertical alignment with the remaining end of the first lever, to which it is connected by a link 31.

A ball float 33 is adjustably connected to the free end 35 of the second lever, by a float arm 37 which is slidably receivable in the end of such lever and fixed in any desired adjusted position by a locking screw 39.

In the absence of any other provisions, the valve movements will follow along conventional lines, in that the valve will be entirely under control of the float, the position of which in turn, is governed by the liquid level in the flush tank. Under these conditions, as in conventional flushing apparatus, the valve movement toward the valve seat will taper off as the valve approaches the seat, and therefore would be subject to the drawbacks of conventional flushing mechanisms as commented on previously.

The aforementioned drawback possibilities are overcome in the present invention, by superimposing upon the float controlled movements of the valve, a forcible seating of the valve under increased pressure, as the valve approaches the valve seat. In the preferred embodiment of the invention illustrated in the drawings, this is accomplished by imparting to the fulcrum post a sharp downward thrust, just as the valve is about to seat. In response to such downward thrust, the lever assembly will follow as a unit about its fixed hinge axis, and thus transfer such downward thrust to the valve.

The means for creating such downward thrust of the fulcrum post at the proper moment, includes a housing 41 which slidably receives the fulcrum post, the lower end of which is affixed to a diaphragm 43 within the housing. Such diaphragm serves to partition the housing into two chambers 45 and 47, one of which is connected to the main flow chamber by a flow passage 49, while in the other housing chamber, is a compression spring 51 bearing against the diaphragm and normally urging the diaphragm in the direction of reducing the volume of the flow-connected chamber. This spring has a calibration value, lower than the full flow pressure of the liquid in the system.

In the operation of the ball cock valve assembly of the present invention, when installed as part of a flush mechanism in a flush tank, the ball float will ride on the level of the water in such tank, and inasmuch as such tank is "full" until flushing occurs, the valve will be seated to block flow of water into the tank via the intake pipe.

During a flushing cycle, the ball float will drop with the water level, and thus raise the valve off the valve seat, to permit inflow of water into the main flow chamber. The greater portion of such water will flow out the discharge opening and ultimately into the tank, to initiate a filling cycle, while a small portion of such water will flow through the passage 49 to the flow connected chamber 45 where the pressure of such water will overcome the compressive force of the spring 51 and lift the diaphragm, and along with it, raise the fulcrum post slightly.

As the filling cycle approaches completion, the valve will approach its valve seat, and as it is about to seat, the resultant drop in pressure of liquid within the flow-connected chamber, will permit the compression spring to take over and restore the diaphragm and fulcrum post, with a sudden downward thrust, to its initial position. It is this sudden downward thrust of the fulcrum post which forcibly seats the valve.

It will be apparent from the foregoing description of my invention, that the same fulfills all the objects attributed thereto, and while I have described the same in its preferred form and in considerable detail, the invention is subject to alteration and modification without departing from the underlying principles involved, and I, accordingly, do not desire to be limited in my protection to the specific details illustrated and described except as may be necessitated by the appended claims.

I claim:

1. A valve assembly for a flush mechanism comprising, a main flow chamber having an intake pipe opening, and a discharge opening, an intake pipe extending into said intake pipe opening, valve means including a valve and valve seat, adapted in its closed condition, to block flow of liquid through said intake pipe, float means for operating said valve in response to variations in liquid level when installed in a flush tank, and means for forcibly seating said valve during the termination of a closing stroke, said means including a housing, movable partition means dividing said housing into two chambers, a flow connection between said main flow chamber and one of said housing chambers, and a spring in pressure engagement with said movable partition means in a direction tending to diminish said connected housing chamber, said spring having a calibration value less than the pressure of water in said main flow chamber when said valve is in substantially open condition, whereby said means becomes incapable of forcibly seating said valve while said valve is in substantially open condition.

2. A valve assembly for a flush mechanism comprising, a main flow chamber having an intake pipe opening, and a discharge opening, an intake pipe extending through said intake pipe opening and providing a valve seat within said chamber, a valve supported in said chamber and adapted to seat upon said valve seat, float means for operating said valve in response to variations in liquid level when installed in a flush tank, said float means including a first lever hingedly secured to a fixed point in such flush mechanism and supporting said valve therefrom, a fulcrum post, a second lever pivotally mounted at an intermediate point thereof on said fulcrum post, with one end of said second lever in substantial vertical alignment with a free end of said first lever, a link connecting such vertically aligned ends of said lever, a float carried by said second lever from the remaining end of said second lever, and means for forcibly seating said valve during the termination of a closing stroke, said means including a housing slidably receiving said fulcrum post, a diaphragm within said housing partitioning the same into two chambers and connecting centrally thereof to said fulcrum post, a flow connection from said main flow chamber to one of said housing chambers, and means including a spring, normally urging said diaphragm in the direction of reducing the volume of said flow connected chamber, said spring having calibration value lower than the full flow pressure of liquid against said diaphragm when installed in a flush tank.

3. A valve assembly for a flush mechanism comprising, a main flow chamber having an intake pipe opening, a valve opening in alignment with said pipe opening, and a discharge opening, an intake pipe extending through said intake pipe opening and providing a valve seat within said chamber, a valve slidably mounted in said valve opening and adapted to seat upon said valve seat, means for operating said valve in response to variations in liquid level when installed in a flush tank, said means including a first lever hingedly secured at one end to a fixed point in such flush mechanism and supporting said valve at an intermediate point of said lever, a fulcrum post, a second lever pivotally mounted at an intermediate point thereof on said fulcrum post, with one end of said second lever in substantial vertical alignment with the other end of said first lever, a link connecting such vertically aligned ends of said levers, a float carried by said second lever from the remaining end of said second lever, and means for forcibly seating said valve during the termination of a closing stroke, said means including a housing slidably receiving said fulcrum post, a diaphragm within said housing partitioning the same into two chambers and connecting centrally thereof to said fulcrum post, a flow connecting from said main flow chamber to one of said housing chambers, and spring means normally urging said diaphragm in the direction of reducing the volume of said flow connected chamber, said spring means including a spring having a calibration value lower than the full flow pressure of liquid against said diaphragm when installed in a flush tank.

4. A valve assembly for a flush mechanism comprising, a main flow chamber having an intake pipe opening, a valve opening in alignment with said pipe opening, and a discharge opening, an intake pipe extending through said intake pipe opening and providing a valve seat within said chamber, a valve slidably mounted in said valve opening and adapted to seat upon said valve seat, float means for operating said valve in response to variations in liquid level when installed in a flush tank, said float means including a first lever hingedly secured at one end to a fixed point in such flush mechanism and supporting said valve at an intermediate point of said lever, a fulcrum post, a second lever pivotally mounted at an intermediate point thereof on said fulcrum post, with one end of said second lever in substantial vertical alignment with the other end of said first lever, a link connecting such vertically aligned ends of said levers, a float carried by said second lever from the remaining end of said second lever, and means for forcibly seating said valve during the termination of a closing stroke, said means including a housing slidably receiving said fulcrum post, a diaphragm within said housing partitioning the same into two chambers and connecting centrally thereof to said fulcrum post, a flow connection from said main flow chamber to one of said housing chambers, and means including a compression spring in the other of said housing chambers, normally urging said diaphragm in the direction of reducing the volume of said flow connected chamber, said spring having a calibration value lower than the full flow pressure of liquid against said diaphragm.

References Cited in the file of this patent

UNITED STATES PATENTS

| Number | Name | Date |
|---|---|---|
| 846,132 | McGraw | Mar. 5, 1907 |
| 1,313,889 | Ford | Aug. 26, 1919 |
| 1,339,750 | Foister | Mar. 11, 1920 |
| 1,705,367 | Kennedy | Mar. 12, 1929 |
| 2,020,463 | Fillmann | Nov. 12, 1935 |
| 2,227,632 | Clegg | Jan. 7, 1941 |